United States Patent
Beachnau Hood et al.

(10) Patent No.: US 10,560,584 B2
(45) Date of Patent: Feb. 11, 2020

(54) DENSITY CLASSIFIERS BASED ON PLANE REGIONS

(71) Applicant: Hewlett-Packard Development Company, L.P., Houston, TX (US)

(72) Inventors: Dawn M Beachnau Hood, Portland, OR (US); Matthew A Shepherd, Vancouver, WA (US); Mark H MacKenize, Corvallis, OR (US); Weiyun Sun, Vancouver, WA (US); Milan Justel, Vancouver, WA (US); Robert Yraceburu, Camas, WA (US); Steve O Rasmussen, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 107 days.

(21) Appl. No.: 15/761,490

(22) PCT Filed: Dec. 11, 2015

(86) PCT No.: PCT/US2015/065326
§ 371 (c)(1),
(2) Date: Mar. 20, 2018

(87) PCT Pub. No.: WO2017/099804
PCT Pub. Date: Jun. 15, 2017

(65) Prior Publication Data
US 2018/0275635 A1    Sep. 27, 2018

(51) Int. Cl.
*H04N 1/00* (2006.01)
*G06K 15/00* (2006.01)
(Continued)

(52) U.S. Cl.
CPC ....... *H04N 1/00005* (2013.01); *B29C 64/112* (2017.08); *B29C 64/386* (2017.08);
(Continued)

(58) Field of Classification Search
None
See application file for complete search history.

(56) References Cited

U.S. PATENT DOCUMENTS 5,448,283 A    9/1995    Takeuchi
5,714,990 A    2/1998    Courtney
(Continued)

FOREIGN PATENT DOCUMENTS

CN    102741855 A    10/2012
CN    103796837 A    5/2014
(Continued)

OTHER PUBLICATIONS

Masterson, et al. A Self-Checking High Speed Printer ~ Computer History Museum ~ date unknown ~ 9 pages.

*Primary Examiner* — Scott A Rogers
(74) *Attorney, Agent, or Firm* — HP Inc. Patent Department

(57) ABSTRACT

In an example, a print system include a component device that is operation in a number of state, a density engine, and a component engine. An example density engine identifies a plane region of a plane where print fluid is to be printed based on data of a print job and determines a density classifier for the plane based on a location of the plane region on the plane. An example component engine causes an adjustment of a component attribute of the component device based on the density classifier.

15 Claims, 5 Drawing Sheets

(51) Int. Cl.

| | |
|---|---|
| *H04N 1/23* | (2006.01) |
| *G06K 15/16* | (2006.01) |
| *B41J 2/045* | (2006.01) |
| *H04N 1/17* | (2006.01) |
| *B33Y 50/02* | (2015.01) |
| *B29C 64/112* | (2017.01) |
| *B29C 64/386* | (2017.01) |
| *B29C 64/393* | (2017.01) |
| *G05B 19/4099* | (2006.01) |
| *B33Y 30/00* | (2015.01) |

(52) U.S. Cl.
CPC ............ *B29C 64/393* (2017.08); *B33Y 50/02* (2014.12); *B41J 2/04508* (2013.01); *B41J 2/04586* (2013.01); *G05B 19/4099* (2013.01); *G06K 15/16* (2013.01); *G06K 15/4025* (2013.01); *H04N 1/00082* (2013.01); *H04N 1/00567* (2013.01); *H04N 1/00702* (2013.01); *H04N 1/00708* (2013.01); *H04N 1/00721* (2013.01); *H04N 1/00726* (2013.01); *H04N 1/00912* (2013.01); *H04N 1/17* (2013.01); *H04N 1/233* (2013.01); *H04N 1/2346* (2013.01); *H04N 1/2369* (2013.01); *B33Y 30/00* (2014.12); *G05B 2219/49023* (2013.01)

(56) References Cited

U.S. PATENT DOCUMENTS

| | | |
|---|---|---|
| 6,012,792 A | 1/2000 | Sievert et al. |
| 8,297,728 B2 | 10/2012 | Richards et al. |
| 8,840,210 B1 | 9/2014 | Martinez de Salinas Vazquez et al. |
| 8,967,751 B2 | 3/2015 | Azuma et al. |
| 2008/0158274 A1 | 7/2008 | Tasaka |
| 2011/0211205 A1 | 9/2011 | Itogawa |
| 2014/0092400 A1 | 4/2014 | Bayona et al. |
| 2015/0145910 A1 | 5/2015 | Libinson |
| 2015/0298474 A1 | 10/2015 | Rius Rossell |

FOREIGN PATENT DOCUMENTS

| | | |
|---|---|---|
| EP | 0720914 | 7/1996 |
| JP | 2016-087901 | 5/2016 |
| RU | 2409472 C2 | 1/2011 |
| WO | WO2015108546 A3 | 10/2015 |

DENSITY CLASSIFIERS BASED ON PLANE REGIONS

BACKGROUND

Imaging devices, such as printers, generally include a print path where printing operations are performed. For example, a print path may be a space through the imaging device in which media passes to different areas of the printer to perform an imaging operation. For another example, a printer may take paper from a paper tray, move it to the print zone to print ink onto the paper, and then move the paper to an output stack. For yet another example, a three-dimensional (3D) printer may lower a first layer of material as a second layer of material is printed on top of the first layer. In this manner, an ejection system and/or media may be moved to place print fluid in locations on a plane.

DETAILED DESCRIPTION

Figure 1:
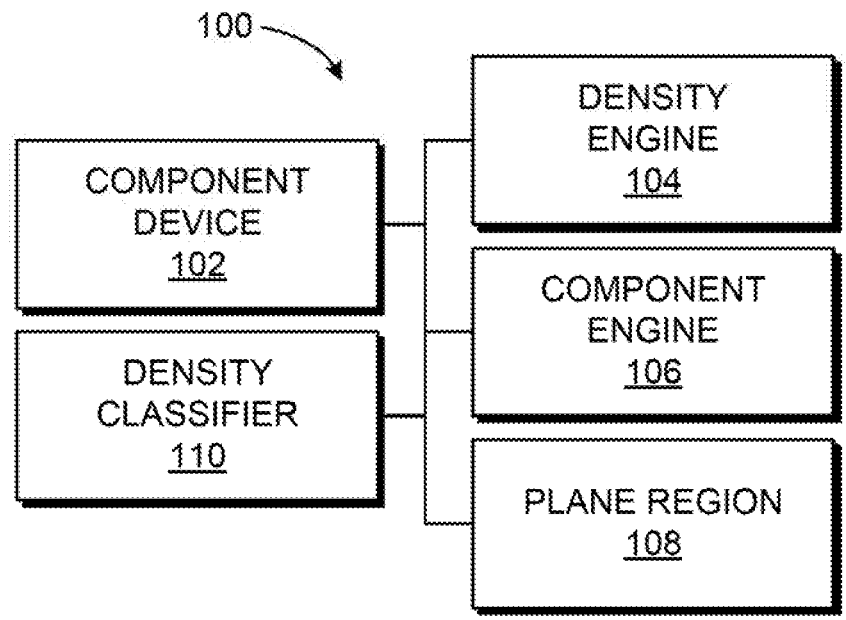
FIGS. 1 and 2 are block diagrams depicting example print systems.

In the following description and figures, some example implementations of imaging apparatus, print systems, and/or methods for adjusting operation of an imaging device are described. An imaging apparatus may be a print device that performs printing operations. In examples described herein, a "print device" may be a device to print content on a physical medium (e.g., paper or a layer of powder-based build material, etc.) with a print fluid (e.g., ink or toner). In the case of printing on a layer of powder-based build material, the print device may utilize the deposition of print fluids in a layer-wise additive manufacturing process. A print device may utilize suitable printing consumables, such as ink, toner, fluids or powders, or other raw materials for printing. An example of print fluid is a substance ejectable from a printhead, such as ink, toner, gloss enhancer, a reflective enhancer, a fluorescing agents, and the like. In some examples, a printing device may be a three-dimensional (3D) printing device and a print fluid may be a powder-based build material, a fusing agent, a coloring agent, and the like.

Wetting media with large quantities of aqueous ink may cause the media to swell, distort, buckle, and/or curl. Thus, media that is wet with a particular degree of printing fluid may not move along the print path in the same way as media wet with a different degree of printing fluid density (e.g., a blank page with no printing fluid versus a photograph covering the entire media). The effect of the print fluid on the state of the media may be influenced by the location of the print fluid on the printing plane. As used herein, the printing plane may refer to the plane on which a medium exists or, in the context of 3D printing, the plane on which a layer of build material is printed.

Various examples described below relate to adjusting operations of an imaging device based on the print density of print fluid placed on a plane during execution of a print job. For example, a component of the print device may be adjusted differently for a first location of the print fluid on the plane than for a second location of the print fluid on the plane. This may be due to a relative effect of distortion of the media in sensitive areas of the media, such as a corner, for example. Such distortions may be a factor that generates operational issues, such as skew or a paper jam, for example. The media control issues may compensated for by identifying print fluid density. By considering location of the possible distortion and print fluid density at the location, proper adjustments may be made in an, individualized way for each plane (e.g., each page) printed by an imaging system. For example, dense ink printed in the center of the page may not need as slow of a speed of the page along the print path as dense ink printed on the edge and/or corners of the page. By dividing the plane into regions, the relationship of print fluid density between regions may be used, as described herein, to dynamically compensate or otherwise assist operation of the print device, such as assist determination of proper movement and speed of a page along the print path.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the term "maintain" (and variations thereof) as used herein means "to create, delete, add, remove, access, update, and/or modify."

Figure 2:
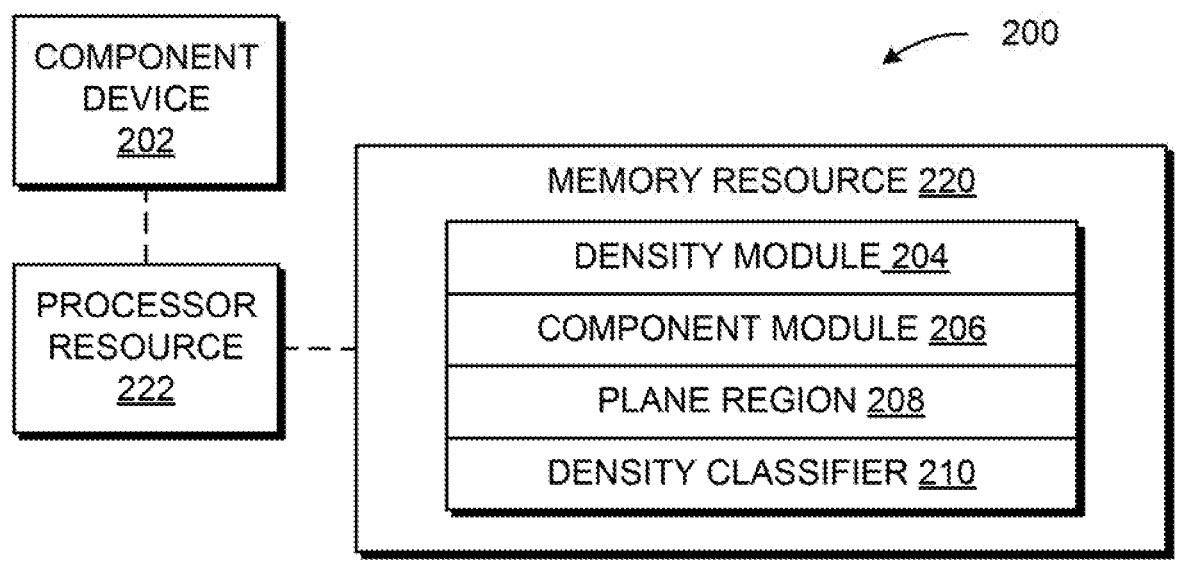

FIGS. 1 and 2 are block diagrams depicting example print systems 100 and 200. Referring to FIG. 1, the example print system 100 of FIG. 1 generally includes a device component 102, a density engine 104, and a component engine 106. In general, the device component 102 may by adjusted by the component engine 106 using a density classifier 110 applied to a plane based on the print fluid printed at a plane region 108 of the plane as identified by the density engine 104.

The component device 102 represents any mechanical part of the print system, electrical part of the print system, or combination thereof that is operational in a number of states. For example, a paper guide may be placed in a raised state or a lowered state. For another example, a roller may be operational at a number of rotational speeds, where each rotational speed is an operational state. The print system 100 may be an inkjet printing system, a laser printing system, or a 3D printing system, for examples. An example inkjet printing system may include components such as a fluid ejection assembly (e.g., a printhead assembly), a fluid supply assembly, a carriage assembly, a print media transport assembly, a service station assembly, and an electronic controller to facilitate control of the any number of components. Other example components of an imaging device include a print bar, a paper guide, a separator pad, a pinch roller, an alignment roller, a starwheel, a drum, a clamp, a servo, a pick tire, a fan, a tray, a bail, a power control unit, a dryer, a fuser, a heating element, alignment devices, a stapler device, a hole punch device, a saddle stitching device, and the like. Attributes of that these components to be adjusted may be location, position, rotation, orientation, size, speed, power, temperature, fluid flow (e.g., air flow or ink flow), alignment force, alignment speed, stapler power, stapler speed, alignment force, alignment speed, hole punch speed, hole punch force, alignment angles, and the like. Another example component adjustment may be a user interface (UI) message prompt by a control panel display, such as a request to change a job attribute, continue printing in a particular mode, provide a slider to adjust print speed or dryer temperature, and the like. Example laser (e.g. toner) printing systems and/or example 3D printing systems may contain similar components, related components, or different components that may be adjustable (e.g., able to change to different operational states, such as two or more operational states).

The density engine 104 represents any circuitry or combination of circuitry and executable instructions to identify a plane region 108 where print fluid is to be printed and determine a density classifier 110 for the plane based on a location of the plane region 108 on the plane. As used herein, a plane region refers to an area on a plane, and may be of any appropriate geometric shape, such as a polygon or a circle. For example, a plane region may be rectangular section comprising a corner edge of a sheet of media, where the sheet of media is the plane. Examples of media include any type of suitable sheet material, such as paper, card stock, transparencies, fabric, packaging material, and the like. Planes may be separated by colors. For example, a print job using cyan magenta yellow black (CMYK) inks may include a cyan plane, a magenta plane, a yellow plane, and a black plane. A density classifier, as used herein is any value, number, character, string, label, category, or other identifier capable of representing a classification related to print fluid density. For example, the density classifier may be represented as a score for print fluid density of the plane, and the density engine 104 may map the plane score to the print speed within a predetermined range of print speeds.

The density engine 104 may identify where print fluid is to be printed on the plane based on data of a print job. The print fluid to be printed may be represented topographically by representing the plane with features of print fluid on an area of the plane, such as a representation of the quantity of print fluid on each region of the plane. For example, a topographical representation of the page size (and page orientation) of the print job may be generated that represents the print job data (i.e., data of the print job that represents the print content) and compared to boundaries of the page on which the print content is to be placed. For another example, print job data may be mapped to topographical regions to receive print fluid on the plane and the plane may be divided into a plurality of tiles where each tile comprises a number of pixels (or voxels). The density engine 104 may be a combination of circuitry and executable instructions to determine whether print fluid data representing an amount of print fluid to place at a first tile within the plane region 108 achieves a density condition. As used herein, a tile is a quadrilateral section of the plane that includes a pixel (or voxel) and a density condition is a representation of a state of print fluid, such as a threshold amount of print fluid within a region, a color of print fluid at a region, a quality of the print fluid at a region, and the like. An example density condition may include multiple density conditions (e.g., multiple density thresholds or multiple layers of print density). A threshold, as used herein, represents a qualification to meet to initiate an operation and may be predetermined or adjusted based on implementation preference. Any example description herein that mentions the term "pixel" may also represent an example where "voxel" is appropriate, such in the case of applying the description to a 3D printing environment. Example tiles may be a single pixel, multiple adjacent pixels (e.g., a superpixel), a square of four pixels, a rectangular section of eight pixels, multiple subpixels, etc. For example, a topographical representation may be a colorant space information (e.g., dot color space, information resulting from processing operations, such as rasterization, on vector graphic information of print job content) that represents the amount of color per channel covering a document of 800 pixel by 600 pixels and the topographical representation may be divided up into square tiles having a size of 32 pixels each.

The density engine 104 may determine the density classifier 110 for the plane based on the relationship of the regions that are to receive a threshold amount of print fluid. The density engine 104 may assign a value to the plane region 108 based on a relationship between a location of the first tile and a location of a second tile within the plane region 108 and select the density classifier 110 based on the value of the plane region 108. The relationship may be predetermined. For example, a lookup table of regions with particular relationships to distortions may be accessed. For another example, a matrix of weights associated with tiles of the plane may be used, where the matrix represents a weighted value of print fluid at a particular location on the plane. In that example, the weights associated with the tiles may be used to calculate regional density scores and/or a page score that represents a density level of the page with weighting influenced by the location of the print density levels. A score, as used herein, may be generated and/or used by the density engine 104 to determine a density classifier 110. For example, the density engine 104 may identify the density classifier 110 using a lookup table with the page score as input in the lookup operation.

The density engine 104 may compensate for an operational factor of the print system 100. For example, the density engine 104 may use scores, such as regional density scores or page scores, and the density engine 104 may apply a modifier to the density score based on the operational factor. As used herein, an operational factor represents any appropriate influence on the operation of the print system 100. Example operational factors include a job attribute, an environmental variable, and a printer state. As used herein, a job attribute represents a characteristic of a print job, such as print settings, user interface (UI) settings, and data path options. Example job attributes include a media type, a page size, a page orientation, a content class, a number of pages, a number of copies, a simplex or duplex job option, a grayscale or color option, a stapling option, a hole punching option, a booklet making option, and the like. As used herein, an environmental variable represents a characteristic of the environment of the print system 100, such as temperature, humidity, air flow, ink level, and the like. As used herein, a printer state represents a state of the print system 100, such as a low power mode, a draft mode, a quiet mode, a paper jam event, a stage of a page in the print path, and the like. The density engine 104 may include circuitry or a combination of circuitry and executable instructions to determine an operational factor of the print system 100 and make adjustments to a density score and/or density classifier based on the determined operational factor. For example, the density engine 104 may identify a job attribute associated with the page of the print job and determine the density classifier 110 based on the job attribute and the page score for the page. For another example, the density engine 104 may determine a stage of the page in the print path and adjust the page score based on the stage of the page in the print path. For yet another example, the density engine 104 may identify an environment variable associated with an operational state of the print system 100 and determine a second density classifier based on the environmental variable and a first density classifier identified via a matrix of weights applied to the regions with a threshold amount of print fluid. The density engine 104 may adjust a regional score and/or a plane score (e.g., a page score) by directly modifying the page score, by modifying a value of the matrix and recalculating the score, or by swapping the matrix for a new matrix associated with the operational factor and recalculating the score. The density engine 104 may override the density classifier 110 produced without consideration of an operational factor in favor of the adjustments associated with the operational factor. For example, the density engine 104 may result in a default density classifier associated with the operational factor. For another example, the density engine 104 may cause the component engine 106 to override the print speed determined by the density engine 104 based on a job attribute, an environmental factor, or a printer state.

The component engine 106 represents any circuitry or combination of circuitry and executable instructions to cause an adjustment of a component attribute of the component device based on the density classifier 110. For example, a printhead assembly may include a printhead or fluid ejection device which ejects drops of print fluid through a plurality of orifices or nozzles, and the component engine 106 may adjust a number of nozzles to generate a direction or speed of ejection based on a density classifier identified by the density engine 104. For another example, a print fluid supply may include a reservoir for storing print fluid and supply printing fluid to a printhead assembly, and the component engine 106 may adjust fluid flow from a reservoir to the printhead assembly based on the density classifier 110. For yet another example, a printhead assembly may include a printbar and the component engine 106 may adjust a temperature of the printbar (or other input energy variable) based on the density classifier 110. For yet another example, the print system may be comprised of rollers to facilitate movement of a page along the print path and the component engine 106 may adjust the rotational speed and/or position of the rollers based on the density classifier 110. For yet another example, a carriage assembly may position a printhead assembly relative to a print media transport assembly and/or the print media transport assembly relative to the printhead assembly, and the component engine 106 may adjust the relative alignment to form a print zone between the printhead assembly and the print media based on the density classifier 110. For yet another example, a print media transport assembly may include, for example, a variety of guides, rollers, wheels, etc. for handling and/or routing of print media through inkjet printing system, including transporting, guiding, and/or directing print media to the print zone, and/or transporting, guiding, and/or directing print media away from print zone, and the component engine 106 may adjust the variety of guides, rollers, wheels, etc. to handle and/or route the print media based on the density classifier 110. For yet another example, a dryer assembly may provide heat and/or air flow to a page and the component engine 106 may adjust a temperature, a position, and/or an air speed of a dryer based on the density classifier 110. For yet another example, a service station assembly may provide for spitting, wiping, capping, and/or priming of a printhead assembly in order to maintain, based on a density classifier, a functionality of the nozzles of the printhead, such as a rubber blade or wiper that periodically passes over the printhead assembly to wipe and clean nozzles of excess printing fluid as directed by the component engine 106 based on the density classifier 110, a cap which covers a printhead assembly to protect nozzles from drying out during periods of non-use as directed by the component engine 106 based on the density classifier, and a spittoon into which a printhead assembly ejects printing fluid to insure that reservoir maintains an appropriate level of pressure and fluidity as directed by the component engine 106 based on the density classifier 110. For yet another example, an electronic controller may communicate with a printhead assembly, a carriage assembly, a print media transport assembly, and a service station assembly, and the component engine 106 may adjust the communications among the components by the controller based on the density classifier 110, such as controlling the timing for ejection of the printing fluid drops, adjusting a pattern of ejected printing fluid drops (e.g., to form characters, symbols, and/or other graphics or images on print media, adjusting print job commands and/or command parameters. Other examples of adaptation of the system 100 with respect to the example print system components discussed herein are contemplated as well as other components not explicitly discussed herein. In this manner, the component engine 106 facilitates adjustments of components of the print system 100 based on the density classifier 110 determined by the density engine 104 from the relative locations of the print fluid on the plane.

In some examples, functionalities described herein in relation to any of FIGS. 4-7 may be provided in combination with functionalities described herein in relation to any of FIGS. 4-7.

FIG. 2 depicts the example system 200 may comprise a memory resource 220 operatively coupled to a processor resource 222. Referring to FIG. 2, the memory resource 220 may contain a set of instructions that are executable by the processor resource 222. The memory resource 220 may contain data used by the system 200, such as a plane region 208 and a density classifier 210. The set of instructions are operable to cause the processor resource 222 to perform operations of the system 200 (e.g., adjust a component device 202) when the set of instructions are executed by the processor resource 222. The set of instructions stored on the memory resource 220 may be represented as a density module 204 and a component module 206. The density module 204 and the component module 206 represent program instructions that when executed function as the density engine 104 and the component engine 106 of FIG. 1, respectively. The processor resource 222 may carry out a set of instructions to execute the modules 204, 206, and/or any other appropriate operations among and/or associated with the modules of the system 200. For example, the processor resource 222 may carry out a set of instructions to map print job data to a topographical representation of a plane to receive print fluid, divide the topographical representation into a plurality of tiles, determine whether an amount of print fluid to be ejected at each tile of the plurality of tiles achieves a density condition (e.g., based on content placement identified via the print job data), determine a plurality of location-based density scores computed in response to a determination that a tile achieves the density condition, combine a number of the location-based density scores of the plane regions, identify a plane score based on a relationship among plane regions associated with the plurality of location-based density scores, and cause a print device to adjust print speed based on a density classifier corresponding to the plane score.

Figure 5:
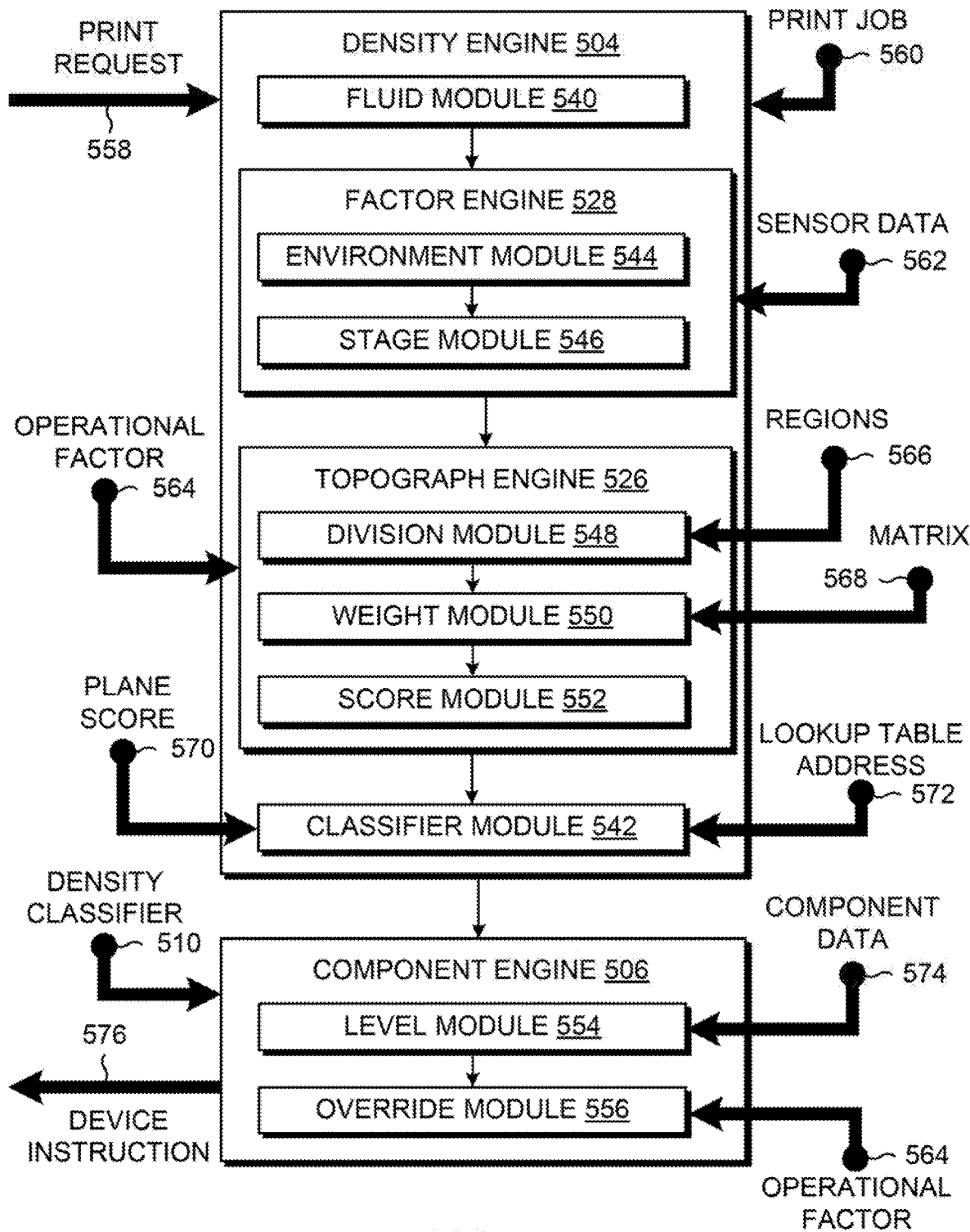

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 5 depicts yet another example of how functionality may be organized into modules.

The processor resource 222 is any appropriate circuitry capable of processing (e.g., computing) instructions, such as one or multiple processing elements capable of retrieving instructions from the memory resource 220 and executing those instructions. For example, the processor resource 222 may be a central processing unit (CPU) that enables operational adjustment by fetching, decoding, and executing modules 204 and 206. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). The processor resource 222 may include multiple processing elements that are integrated in a single device or distributed across devices. The processor resource 222 may process the instructions serially, concurrently, or in partial concurrence.

The memory resource 220 represents a medium to store data utilized and/or produced by the system 200. The medium is any non-transitory medium or combination of non-transitory mediums able to electronically store data, such as modules of the system 200 and/or data used by the system 200. For example, the medium may be a storage medium, which is distinct from a transitory transmission medium, such as a signal. As used herein, a non-transitory storage medium refers to any storage medium with the exclusion of a signal. The medium may be machine-readable, such as computer-readable. The medium may be an electronic, magnetic, optical, or other physical storage device that is capable of containing (i.e., storing) executable instructions. The memory resource 220 may be said to store program instructions that when executed by the processor resource 222 cause the processor resource 222 to implement functionality of the system 200 of FIG. 2. The memory resource 220 may be integrated in the same device as the processor resource 222 or it may be separate but accessible to that device and the processor resource 222. The memory resource 220 may be distributed across devices.

In the discussion herein, the engines 104 and 106 of FIG. 1 and the modules 204 and 206 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on the memory resource 220 may comprise any set of instructions to be executed directly (such as machine code) or indirectly (such as a script) by the processor resource 222.

In some examples, the system 200 may include the executable instructions may be part of an installation package that when installed may be executed by the processor resource 222 to perform operations of the system 200, such as methods described with regards to FIGS. 4-7. In that example, the memory resource 220 may be a portable medium such as a compact disc, a digital video disc, a flash drive, or memory maintained by a computer device, such as a server, from which the installation package may be downloaded and installed. In another example, the executable instructions may be part of an application or applications already installed. The memory resource 220 may be a non-volatile memory resource such as read only memory (ROM), a volatile memory resource such as random access memory (RAM), a storage device, or a combination thereof. Example forms of a memory resource 220 include static RAM (SRAM), dynamic RAM (DRAM), electrically erasable programmable ROM (EEPROM), flash memory, or the like. The memory resource 220 may include integrated memory such as a hard drive (HD), a solid state drive (SSD), or an optical drive.

Figure 3:
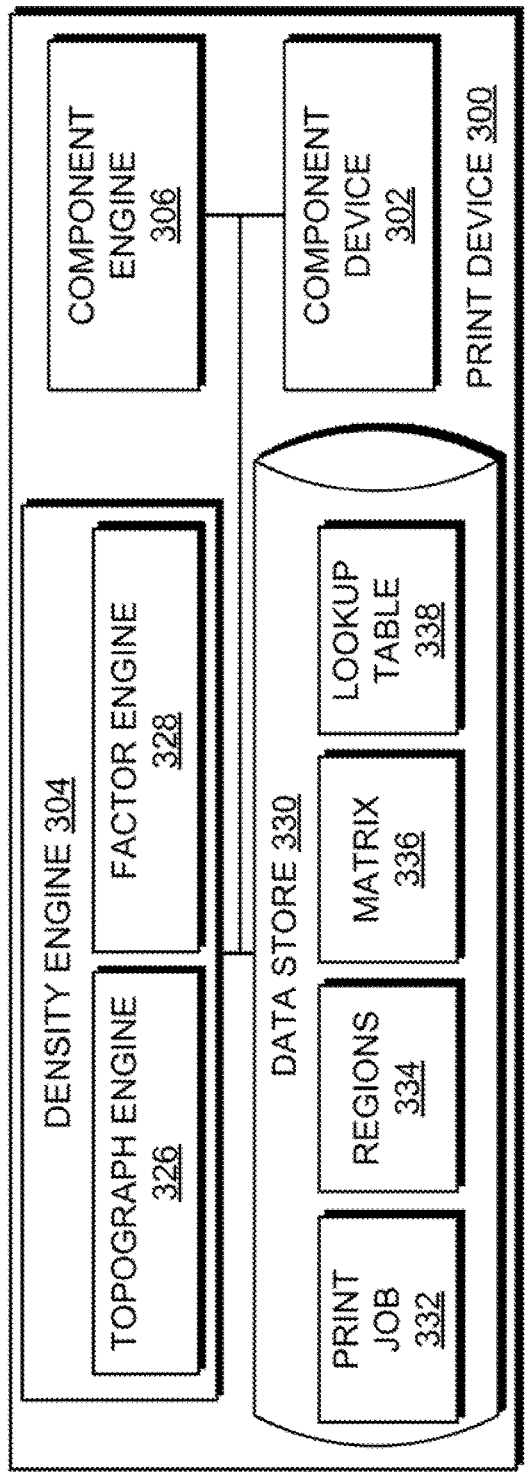
FIG. 3 depicts an example print device in which various print systems may be implemented.

FIG. 3 depicts an example print device 300 in which various example imaging systems may be implemented. The example print device 300 is shown to include an example system 300 for adjusting operation of the print device 300. The system 300 (described herein with respect to FIGS. 1 and 2) may represent generally any circuitry or combination of circuitry and executable instructions to adjust operation of a component using a density classifier based on the regions 334 of the plane to be printed on. The system 300 may include a component device 302, a density engine 304, a component engine 306 that are similar to the component device 102, the density engine 104, and the component engine 106 of FIG. 1, respectively, and the associated descriptions are not repeated in their entirety for brevity. The density engine 304 may include a topograph engine 326 and a factor engine 328. As shown in FIG. 3, the engines 304, 306, 326, and 328 may be integrated into a print device 300, such as a multifunctional peripheral device. The engines 304, 306, 326, and 328 may be integrated via circuitry or as installed instructions into a memory resource of the print device 300.

The topograph engine 326 represents circuitry or a combination of circuitry and, executable instructions to maintain weights associated with page regions on a page, the page being the plane to receive print fluid (e.g., ink or toner) based on the print job. For example, the topograph engine 326 may be a combination of circuitry and executable instructions to select a matrix of weights associated with the print job and adjust the weights based on an operational factor when the operational factor is to be considered in the print density determination. The density engine 304 computes a density score for a plane (e.g., a page) based on a matrix 336 of weights that corresponds to the page regions 334 on the page that achieve a density condition, and the density engine 304 determines the density classifier based on the weighted density score by looking up the weighted density score in the lookup table 338.

The factor engine 328 represents circuitry or a combination of circuitry and executable instructions to identify an operational factor of the print system. For example, the factor engine 328 may be a combination of circuitry and executable instructions to identify a job attribute by parsing print job data, identify an environmental factor by checking sensor data, and identify a state of the print device (e.g., a state of a component of the print device or state of the media in the print device) by checking health status messages or logs.

For example, the factor engine 328 may identify at least one of a page size or a page orientation, the topograph engine 326 may at least one of select a topograph (e.g., a matrix of weights) based on the page size or select the topograph based on the page orientation, and the density engine 304 may superimpose a topographical representation of the print job on the topograph by identifying locations where print fluid is applied to the page based on regions of the page. For another example, the topograph engine 326 may select a set of topographical weights to apply to the plurality of tiles that achieve a density condition based on a job attribute identified by the factor engine 328. For yet another example, the topograph engine 326 may adjust the set of topographical weights to apply to the plurality of tiles that achieve a density condition based on a job attribute identified by the factor engine 328.

The data store 330 may contain information utilized by the engines 304, 306, 326, and 328. For example, the data store 330 may store a print job 332, regions 334 of the plane, a matrix 336 of weighted values associated with the regions 334, and a lookup table 338 to lookup a density classifier based on a plane score derived from the matrix 336.

Referring to FIGS. 1-3, the engines 104 and 106 of FIG. 1 and/or the modules 204 and 206 of FIG. 2 may be distributed across devices. The engine and/or modules may complete or assist completion of operations performed in describing another engine and/or module. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 may perform example methods described in connection with FIGS. 4-7.

Figure 4:
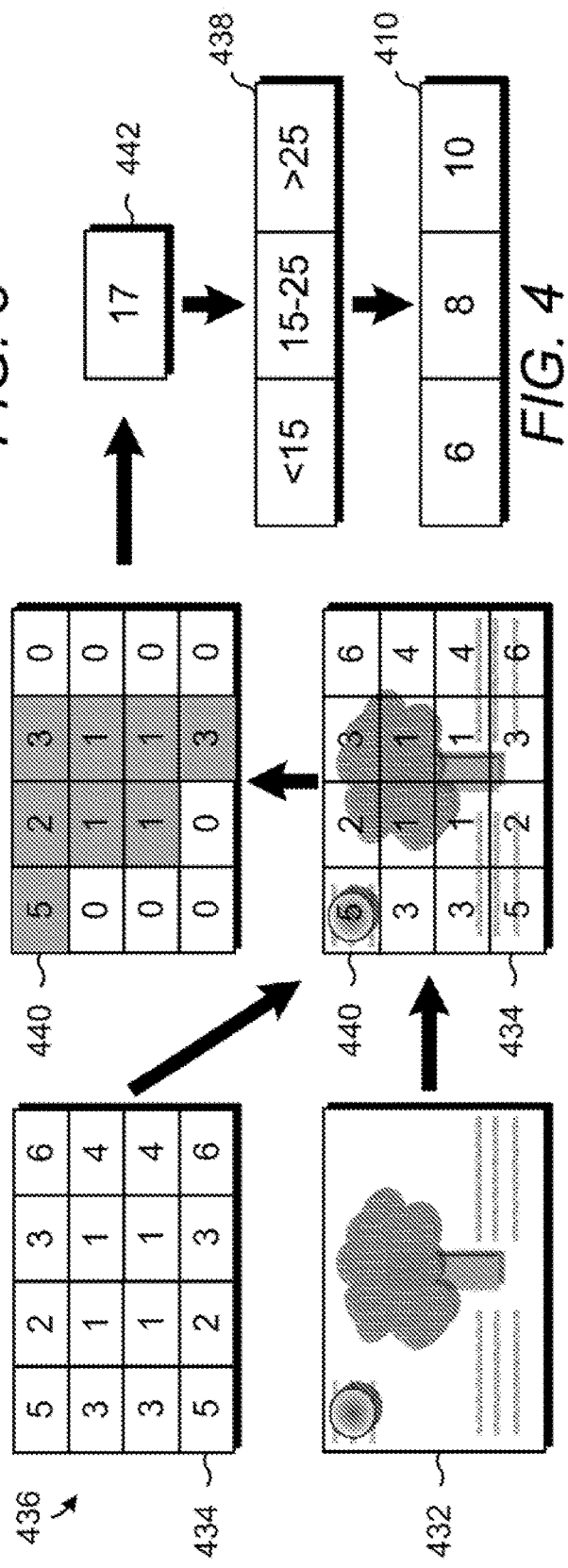
FIGS. 4 and 5 depicts example operations used to implement example print systems.

FIGS. 4 and 5 depicts example operations used to implement example print systems. Referring to FIG. 4, a topographical representation 432 of the media in a condition resulting from the print job is depicted as superimposed with a plurality of tiles, such as tile 434, with weighted values based on a matrix 436, where problematic regions (e.g., regions that are more likely than others to become distorted) are identified with higher weighted values than other regions. In the example of FIG. 4, the corners of the page have the highest weighted values associated with them. The print data is compared to the tiles to identify areas that achieve a threshold amount of print fluid. For example, the top left corner region 440 includes an image which requires a sufficient amount of ink to satisfy the threshold, while the bottom left corner 434 includes some text that is insufficient to satisfy the threshold amount of print fluid. The regions with a sufficient amount of print fluid are identified and the weights of those regions are combined (while the weights of the other regions are discarded). The combination of weights in the example of FIG. 3 results in a page score 442 having a value of 17. The page score 17 is compared to buckets 438 of scores and is associated with a density classifier 410 based on the bucket which the score 442 belongs to. In the example of FIG. 3, a score of 17 falls into the bucket range of 15 to 25 and becomes associated with a density classifier of 8, which may represent the print speed to be used for that page.

FIG. 5 depicts example operations associated with example engines used to implement example print systems. Referring to FIG. 5, the example engines of FIG. 5 generally include a density engine 504, a factor engine 528, a topograph engine 526, and a component engine 506 which represent engines similar to the density engine 304, the factor engine 328, the topograph engine 326, and the component engine 306 of FIG. 3, respectively, and their respective descriptions have not been repeated in their entirety. The example engines of FIG. 5 may be implemented on a compute device, such as print device 300 of FIG. 3.

The density engine 504 may be activated based on a print request 558 to complete a print job 560. The data of the print job 560 is provided to the density engine 504 and the density engine 504 identifies a density classifier 510 associated with each page of the print job 560. The density engine 504 may include circuitry or a combination of circuitry and executable instructions to facilitate identifying the appropriate density classifier. The density engine 504 of FIG. 5 includes program instructions represented as a fluid module 540 and a classifier module 542. The fluid module 540 represents program instructions that when executed by a processor resource cause the density engine 504 to identify content of the print job 560 that represents the locations of print fluid to be ejected on the plane. The classifier module 542 represents program instructions that when executed by a processor resource cause the density engine 504 to determine a density classifier 510 representing the relationship of the print fluid locations on the regions of the plane based on a plane score 570 that represents the relationship of print density to the regions of the plane.

The factor engine 528 may include program instructions, such as an environment module 544 and a stage module 546, to facilitate identification of an operational factor 564. The environment module 544 represents program instructions that when executed by a processor resource cause the factor engine 528 to identify an environmental variable, such as a humidity level, based on the sensor data 562. The stage module 546 represents program instructions that when executed by a processor resource cause the factor engine 528 to identify the stage at which the media is in the print path. The factor engine 528 may provide any operational factors 564 identified to the topograph engine 526 to assist in determination of a density score for the plane.

The topograph engine 526 may include program instructions (such as a division module 548, a weight module 550, and a score module 552) to facilitate identification of a score for the plane based on regions 566 of the plane and a matrix 568 of weights associated with the regions 566. The division module 548 represents program instructions that when executed by a processor resource cause the topograph engine 526 to may divide the plane into a plurality of regions 566 (e.g., based on a boundary set). The weight module 550 represents program instructions that when executed by a processor resource cause the topograph engine 526 to apply weights to the regions 566 using a matrix of values 568 and determines regional density scores for each of the regions 566. The score module 552 represents program instructions that when executed by a processor resource cause the topograph engine 526 to combine the weights identified from executing the weight module 550 to generate a score 570 to assign to the plane by causing the topograph engine 526 to access a lookup table at the lookup table address 572 and providing the plane score 570 to the lookup table to retrieve a density classifier 510. The score module 552 may be executed multiple times for a single page of the print job. For example, the topograph engine 526 may execute the score module 552 to determine a plane score for each color plane of a print job to be printed with a plurality of colored inks, such as CMYK, and the topograph engine 526 may determine a density classifier based on a comparison and/or combination of the plane scores for each color plane.

The component engine 506 receives the density classifier 510 from the density engine 504 and determine adjustment to a component device based on the density classifier 510. The density classifier may be the combined regional density score, an attribute level, or an intermediate value that translates between a score and an attribute level, for example. The component engine 506 may include program instructions, such as a level module 554 and an override module 556, to facilitate identification of a component attribute level for a component device of a print device. The level module 554 represents program instructions that when executed by a processor resource cause the component engine 506 to identify a level of an attribute of a component device using the density classifier 510 based on component data 574 regarding operations that affect a print device characteristic, such as print speed. The override module 557 represents program instructions that when executed by a processor resource cause the component engine 506 to override the attribute level when an operational factor 564 of a priority class is achieved. Example operational factors that may override an attribute level identified using the density classifier 510 include a quiet mode, a high humidity level, and the page scores of other pages of the print job. The component engine 506 sends a device instruction 576 to the component device to operate at the attribute level identified by executing the level module 554.

Figure 6:
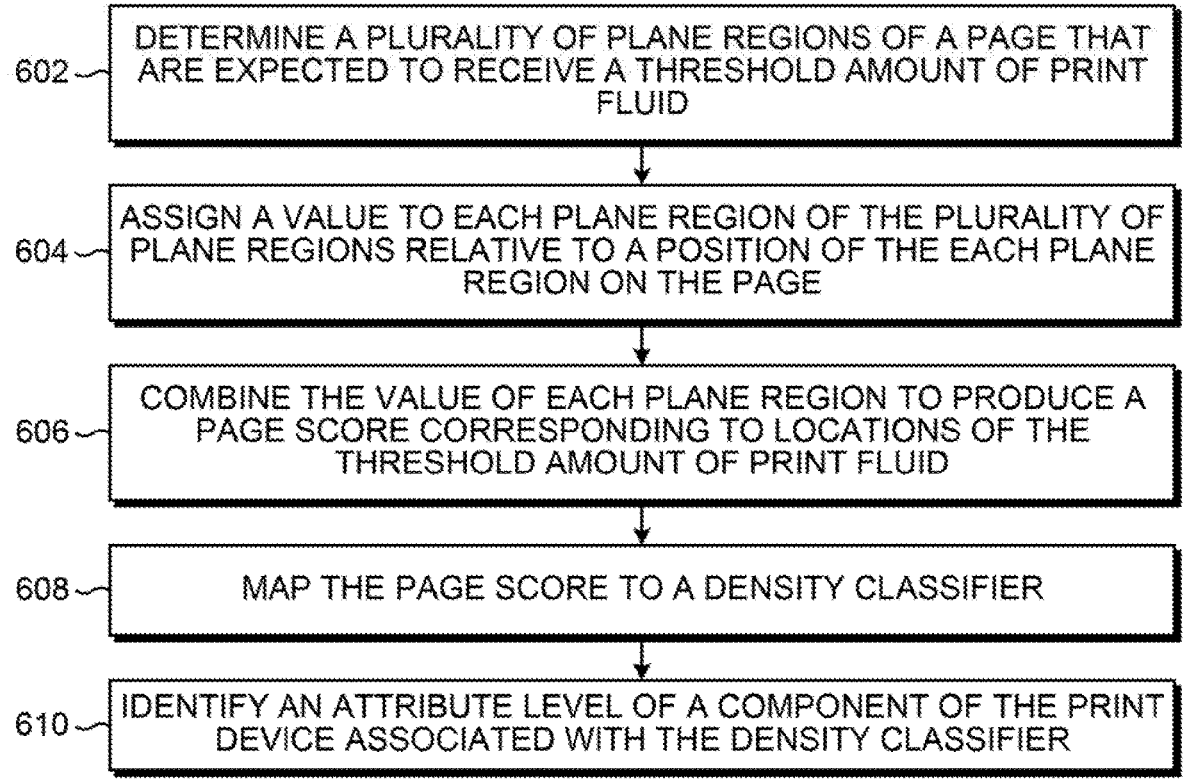
FIGS. 6 and 7 are flow diagrams depicting example methods for adjusting operation of a print device.
Figure 7:
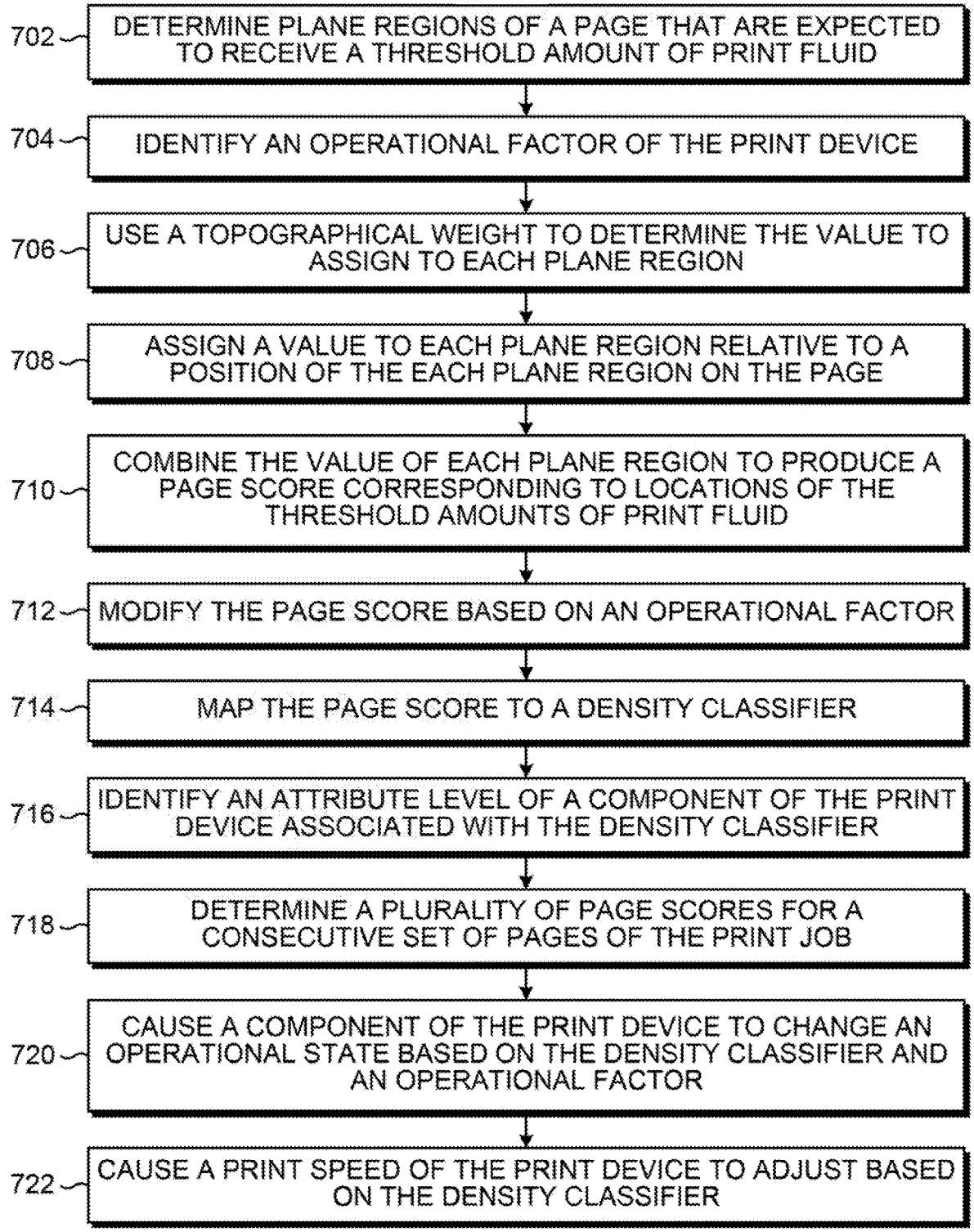

FIGS. 6 and 7 are flow diagrams depicting example methods for adjusting operation of a print device. Referring to FIG. 6, example methods for adjusting operation of a print device may generally comprise determining a plurality of plane regions of a page, assigning a value to each plane region relative to a position of the plane region on the page, producing a page score by combining the value of each plane region, mapping the page score to a density classifier, and identifying an attribute level of a component of the print device associated with the density classifier. The methods described herein are performable by a density engine and a component engine, such as density engine 102 and component engine 104 of FIG. 1.

At block 602, a plurality of plane regions of a page that are expected to receive a threshold amount of print fluid is determined. For example, a density engine, such as density engine 104 of FIG. 1, may translate print job data to instructions that cause print fluid to be ejected at locations on the plane. The plurality of plane regions may be a predetermined segmentation of a page (where segments with the expected threshold amount of print fluid are identified) or may be dynamically identified as regions on the page that receive the threshold amount of print fluid.

At block 604, a value is assigned to each plane region of the plurality of plane regions relative to a position of the each plane region on the page. For example, a density engine, such as density engine 104 of FIG. 1, may generate an array (or other data structure) with values assigned to respective locations of the page associated with the index of the array. The value assigned to each plane region is associated with a print fluid density expected at that region of the plane. The values may be assigned to each plane region based on the likelihood of distortion at that plane region in comparison to other regions on the plane.

At block 606, the value of each plane region is combined to produce a page score corresponding to locations of the threshold amount of print fluid. For example, a density engine, such as density engine 104 of FIG. 1, may calculate a page score by summing the values assigned to each plane region based on the location and the amount of print fluid received at that region.

At block 608, the page scores is mapped to a density classifier. For example, a density engine, such as density engine 104 of FIG. 1, may generate a density classifier that is representative of a relative print fluid density at the plane regions (e.g., based on the amount of print fluid at the region and the location of the regions with print fluid on the plane).

At block 610, an attribute level of a component of the print device is identified based on the density classifier. For example, a component engine, such as component engine 106 of FIG. 1, may identify the operational levels of components associated with the density classifier based on predetermined tables or relative calculations from the current operational states of the components. In this manner, the location of the print fluid printed on a page may be used to adjust a component of a print device to accommodate for the amount of print fluid at that location, and thus, may, for example, take into consideration the placement of print fluid at particular regions of the plane when determining attributes of the print device, such as print speed.

FIG. 7 includes blocks similar to blocks of FIG. 6 and provides additional blocks and details. In particular, FIG. 7 depicts additional blocks and details generally regarding identifying an operational factor, using a topographical weight, modifying a page score, determining a plurality of page scores, causing a component of the print device to change, and causing a print speed of the print device to adjust. Blocks 702, 708, 710, 714, and 716 are similar to blocks 602, 604, 606, 608 and 610 of FIG. 6 and, for brevity, their respective descriptions are not repeated in their entirety.

At block 704, an operational factor of the print device is identified. For example, a factor engine, such as the factor engine 328 of FIG. 3, may analyze print job settings and/or sensor data to identify any operational factors to consider in the determination of a page score. For example, an operational factor may be considered in, a determination of what topographical weight to use to determine the value to assign to each plane region at block 706. The topographical weights may be represented as a matrix or some other data structure that is capable of organizing multi-dimensional data when the regions of the plane to be considered are described in multiple dimensions. For example, a matrix may contain multiple dimensions to describe plane information for ink, gloss, fluorescence, and/or reflective layers of print fluid. Other representations of regions may be compatible with the systems and methods described herein, such as describing regions as a number of lines from the top of the page to the bottom or describing regions with respect to margins of the page (e.g., within a proximity of the margin). Multiple weights and/or multiple matrices may be used. For example, a set of topographical matrices of weights may be used, where each matrix of the set are associated with an operational factor or a combination operational factors, such as a first topographical matrix to use when a duplex job is selected, a second topographical matrix when a quiet mode is selected, a third topographical matrix to use when a dryer is selected to be used, etc.

The topographical weight may be modified based on an operational factor, such as a print path stage or a job attribute, before applying the weight to determine the value to assign to a plane, or a topographical weight may be selected from a set of topographical weights based on a variation of operational factors. At block 712, the page score may be modified based on an operational factor, such as a job attribute of an environmental variable. For example, a density engine, such as density engine 304 of FIG. 3, may increase a topographical weight of the matrix when the operational factor achieves a priority level above a priority threshold. For example, the temperature level of the print device may exceed a level or quiet mode is set, where quiet mode is associated with a highest priority level.

At block 718, a plurality of page scores are determined for a consecutive set of pages of the print job. For example, a density engine, such as density engine 304 of FIG. 3, may determine the density page scores for a page to be printed before the current page, and if that page score suggests a slower print speed then the print speed for the current page may be set to the same or the current page may be sent along an alternative paper path to accommodate the difference in print speed. Each page score of the plurality of page scores may be representative of an overall topographic print fluid density for each consecutive page of a set of pages of a print job where the overall topographic print fluid density is based on the regional topographic print fluid densities and the relationship of the regions to the plane. In this manner, the print density of multiple pages of the print job may be considered when managing the document flow of the print job, such as the print speed for each page. For example at block 722, the print speed may be adjusted based on the plurality of page scores, rather than just a single page score.

At block 720, a component of the print device is caused to change an operational state based on the density classifier and an operational factor, such as a position of the page in the print path. The component may be changed based on the attribute level of a component of the print device identified, based on the density classifier, at block 716. For example, a component engine, such as component engine 306 of FIG. 3, may identify an attribute level of a component that is associated with the density classifier (e.g., all four corners of a page are below a threshold amount of ink and the attribute level associated with the highest operational print speed level may not be selected when the printer settings are set to quiet mode). At block 722, a print speed of the device is caused to be adjusted based on the density classifier. For example, a component engine, such as component engine 306 of FIG. 3, may increase the print speed when the density classifier indicates a low regional print density relationship and no operational factors hinder the classification and may decrease the print speed when the density classifier indicates a high regional print density relationship (such as high levels of black ink at all corners of a page) and/or an operational factor that increases the density classifier to level associated with a lower print speed. In this manner, page speeds may, for example, be maximized by taking into consideration the areas of higher print density on the print plane.

Although the flow diagrams of FIGS. 4-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A print system comprising:
 a component device operational in a number of states;
 a density engine to:
  identify a plane region of a plane where print fluid is to be printed based on data of a print job;
  determine a density classifier for the plane based on a location of the plane region on the plane; and
 a component engine to cause an adjustment of a component attribute of the component device based on the density classifier.

2. The system of claim 1, wherein the density engine:
 determines whether print fluid data representing an amount of print fluid to place at a first tile within the plane region achieves a density condition;
 assigns a value to the plane region based on a relationship between a location of the first tile and a location of a second tile within the plane region; and
 selects the density classifier based on the value of the plane region.

3. The system of claim 1, wherein the density engine further comprises:
 a topograph engine to maintain weights associated with page regions on a page, the page being the plane to receive print fluid based on the print job; and
 a factor engine to identify an operational factor of the print system.

4. The system of claim 3, wherein the density engine:
 computes a density score for the page based on a matrix of weights that corresponds to the page regions on the page that achieve a density condition; and
 determines the density classifier based on the weighted density score.

5. The system of claim 4, wherein the density engine:
 applies a modifier to the density score based on the operational factor; and
 identifies the density classifier using a lookup table with the page score as input.

6. The system of claim 3, wherein:
 the factor engine identifies at least one of a page size or a page orientation; and
 the topograph engine at least one of:
  selects a topograph based on the page size; or
  selects the topograph based on the page orientation.

7. The system of claim 3, wherein:
 the factor engine determines a stage of the page in the print path; and
 the density engine adjusts the page score based on the stage of the page in the print path.

8. The system of claim 3, wherein:
 the factor engine identifies an environment variable associated with an operational state of the print system; and
 the density engine determines the density classifier based on the environment variable.

9. The system of claim 3, wherein:
 the factor engine identifies a job attribute associated with the page of the print job; and
 the density engine determines the density classifier based on the job attribute.

10. A non-transitory computer-readable storage medium comprising a set of instructions executable by a processor resource to:
 map print job data to a topographical representation of a plane to receive print fluid;
 divide the topographical representation into a plurality of tiles, each tile of the plurality of tiles comprising a number of pixels;

determine whether an amount of print fluid to be ejected at each tile of the plurality of tiles achieves a density condition based on content placement identified via the print job data;

determine a plurality of location-based density scores, each location-based density score computed in response to a determination that a tile achieves the density condition;

identify a plane score based on a relationship among plane regions associated with the plurality of location-based density scores, the plane score representative of a combination of the plurality of location-based density scores at the plane regions; and cause a print device to adjust print speed based on a density classifier corresponding to the plane score.

11. The medium of claim 10, wherein the set of instructions is executable by the processor resource to at least one of:

select, based on a job attribute, a set of topographical weights to apply to the plurality of tiles that achieves the density condition; or adjust, based on the job attribute, the set of topographical weights to apply to the plurality of tiles that achieves the density condition.

12. The medium of claim 10, wherein the set of instructions is executable by the processor resource to at least one of:

map the plane score to the print speed within a predetermined range of print speeds; or override the print speed based on a job attribute, an environmental factor, or a printer state.

13. A method of adjusting operation of a print device comprising:

determining a plurality of plane regions of a page that are expected to receive a threshold amount of print fluid;

assigning a value to each plane region of the plurality of plane regions relative to a position of the each plane region on the page, the value associated with a print fluid density;

combining the value of each plane region to produce a page score corresponding to locations of the threshold amount of print fluid;

mapping the page score to a density classifier, the density classifier representative of print fluid density at the plane regions; and identifying an attribute level of a component of the print device associated with the density classifier.

14. The method of claim 13, comprising:

modifying a topographical weight applied to determine the value to assign to each plane region based on a print path stage or a job attribute;

modifying the page score based on a job attribute or an environmental variable;

causing a component of the print device to change an operational state based on the density classifier and a position of the page in print path; and causing a print speed of the print device to adjust based on the density classifier.

15. The method of claim 13, comprising:

determining a plurality of page scores, each page score of the plurality of page scores representative of an overall topographic print fluid density for a consecutive page of a set of pages of the print job; and adjusting a print speed of the print device based on the plurality of page scores.

* * * * *